United States Patent

[11] 3,617,518

| [72] | Inventors | John H. Sinfelt<br>Berkeley Heights;<br>Allan E. Barnett, Westfield; James L.<br>Carter, Chatham, all of N.J. |
|---|---|---|
| [21] | Appl. No. | 835,239 |
| [22] | Filed | June 20, 1969 |
| [45] | Patented | Nov. 2, 1971 |
| [73] | Assignee | Esso Research and Engineering Company |

[54] INHIBITION OF HYDROGENOLYSIS
10 Claims, No Drawings

[52] U.S. Cl. ..................................... 208/138,
208/134, 208/137, 260/668 D, 260/673.5,
260/676, 252/474
[51] Int. Cl. ....................................... C10g 35/06,
C10g 35/08
[50] Field of Search .......................... 208/137,
138, 134

[56] References Cited
UNITED STATES PATENTS

| 2,897,135 | 7/1959 | Doumani ..................... | 208/137 |
| 2,911,357 | 11/1959 | Myers et al. ................. | 208/138 |
| 3,000,811 | 9/1961 | Murray et al. ............... | 208/138 |
| 3,193,349 | 7/1965 | Mooi ........................... | 208/138 |
| 3,367,885 | 2/1968 | Rabo et al. ................... | 208/137 |

Primary Examiner—Herbert Levine
Attorneys—Chasan and Sinnock and Michael Conner

ABSTRACT: The incorporation of a Group IB metal with a Group VIII nonnoble metal or Group VIII$_1$ noble metal (Ru or Os) as a bimetallic catalyst, and possibly an alloy, results in the formation of a catalyst which, when used in a hydrocarbon conversion process, minimizes the hydrogenolysis activity of the Group VIII metal while maintaining or enhancing the catalytic activity of the Group VIII metal for conversion processes such as hydrogenation, dehydrogenation, or aromatization.

3,617,518

INHIBITION OF HYDROGENOLYSIS

BACKGROUND OF THE INVENTION

The use of bimetallic catalysts in hydrocarbon conversion techniques is well known; specific combinations of metals have been found which will produce a variety of improvements. Specifically, U.S. Pat. No. 2,911,357 pertains to a technique for stabilizing the surface of a catalyst to protect against excessive loss of metal surface area by sintering. The specifications discloses combinations of platinum, palladium, and rhodium, Group VIII noble metals, with various other metals such as copper, manganese, gold, etc. Some of these metals, from the second grouping, fall within Group IB of the Periodic Table.

A number of patents as illustrated by U.S. Pat. Nos. 2,802,889, 3,243,387 and 2,927,141 relate to the selective hydrogenation of acetylene using composites of palladium with several other metals including those of Group IB of the Periodic Table. Generally, these reactions take place at lower temperatures; typical temperatures are illustrated in the U.S. Pat. No. '889, in which the reaction takes place at about 60°to 200° C. In fact, within this patent it is stated that catalysts which require reaction temperatures above 250° C. are considered insufficiently active for hydrogenation.

None of the above-mentioned patents are concerned with the problem of hydrogenolysis. Hydrogenolysis is the cleavage of a bond in an organic compound with simultaneous addition of a hydrogen atom to each fragment. With hydrocarbons, this results in the production of methane, at the expense of more valuable products. The problem is particularly acute when temperatures of 300° to 1,000° F. are utilized since, for the most part, hydrogenolysis, in the presence of a conversion catalyst, does not occur below this temperature range.

SUMMARY OF THE INVENTION

According to this invention, is has unexpectedly been discovered that the hydrogenolysis traditionally associated with catalytic conversion catalysts and particularly nonnoble Group VIII or noble Group $VIII_1$ metal (Ru or Os) catalysts which operate in the presence of hydrogen, may be substantially inhibited by incorporating into the Group VIII metal catalysts a Group IB metal. Although not intending to be bound by any particular theory, it appears that the incorporation of the Group IB metal leads to the formation of an alloy. The catalyst is bimetallic in nature having both Group VIII metal and Group IB metal elements. It may be used at any temperature but is will be most effective at elevated temperatures, i.e., 300° to 1,000° F., because in the conversion of hydrocarbons substantially all of the hydrogenolysis occurs above a temperature of about 300° F. Pressure may also be elevated and should vary between 0 and 1,000 p.s.i.g.

The instant catalyst may be used as an unsupported catalyst or alternatively, in a preferred embodiment as a supported catalyst on a high surface area support. By high surface area support, it is meant one in which the surface area is about 30 to 500 m.² /gram. A moderately acidic support with this surface area would give an ideal catalyst for catalytic reforming. It should be emphasized that the instant catalyst is effective for catalytic reforming wherein several reactions are proceeding concurrently and would also be effective for the individual reactions if they were to occur separately.

More specifically, catalytic reforming is a process in which a naphtha, either virgin or cracked, Fischer-Tropsch or mixtures thereof, is contacted in the presence of hydrogen with a solid catalytic material.

In the instant case, the naphtha, which is a petroleum fraction boiling between about 80° and 450° F. would be contacted with a catalyst comprising a Group IB metal and a Group VIII nonnoble metal or Group $VIII_1$ noble metal and mixtures thereof at catalytic reforming conditions, in the presence of a reducing atmosphere such as hydrogen. The individual reactions which may be catalyzed, while hydrogenolysis is substantially inhibited, include hydrogenation, dehydrogenation, isomerization, and dehydrocyclization which is also referred to as aromatization. Particularly, cases which will shortly be enumerated show that along with the inhibition of the hydrogenolysis, certain desired reactions such as dehydrocyclization and dehydrogenation may actually be enhanced.

More specifically, the catalyst of the instant invention comprises a Group VIII nonnoble metal or Group $VIII_1$ noble metal (Ru or Os) and a Group IB metal; a surface alloy of the two metals may be formed. Typical Group VIII metals which may be utilized are iron, cobalt, nickel, ruthenium and osmium. These metals are combined with the metals of Group IB of the Periodic Table, which are copper, silver, and gold. It should be noted that the effect of the Group IB metal on the Group VIII metal is observed even in systems in which the mutual solubility of the metals is very small. For systems where concentrated bulk alloys are not formed, it may happen that alloy formation is limited to the surface layer of atoms.

The bimetallic catalysts of the present invention can be prepared readily by a variety of methods. In the case of supported bimetallic catalysts, a particularly convenient method is the coimpregnation of the support with salts of the metals in question. For example, a copper-nickel catalyst supported on silica can be prepared readily by just wetting the surface of silica with an aqueous solution of nickel and copper nitrates. The resulting material is then dried at a temperature of about 212°-230 ° F. and subsequently reduced at elevated temperature, i.e., (700°-1,000° F.) in hydrogen. The reduction is generally performed in situ in the reactor. In the case of unsupported bimetallic catalysts, the metals can be coprecipitated from solution in the form of carbonates or hydroxides. For example, copper-nickel alloys can be prepared readily by coprecipitation from an aqueous solution of copper and nickel nitrates, using ammonium bicarbonate. The precipitate is dried, calcined to convert it to the mixed oxide, and subsequently reduced in hydrogen to form the copper-nickel alloy.

In the event that a supported catalyst is utilized, the catalyst would comprise about 0.01 to 75 percent by weight, preferably 0.10 to 50 percent by weight of Group VIII metal and 0.01 to 75 percent by weight, preferably 0.05 to 50 percent by weight of Group IB metals and the remainder support. The support should have a high surface area of roughly 75 to 500 m.² /gram. Typical supports which would be satisfactory for the instant invention are alumina, silica, amorphous or crystalline aluminosilicates, magnesia, and silica-magnesia, with or without added halogen (Cl or F).

This catalyst is contacted with a feed stream which is to be catalytically reformed in the presence of hydrogen. Typical hydrocarbon molecules in feed streams are those having five to 12 carbon atoms. Included in the scope of the invention are any of the individual reactions which made up reforming, i.e., (1) dehydrogenation as typified by the removal of hydrogen from naphthenes to form the corresponding aromatic hydrocarbon as in the case of methlycyclohexane which is dehydrogenated to form toluene; (2) isomerization of normal paraffins to form branched chain paraffins, e.g., normal pentane to isopentane, normal hexane to isohexane, or isomerization of ring compounds such as ethylcyclopentane to form methylcyclohexane, which latter compound is then dehydrogenated to form toluene; (3) hydrocracking of higher boiling constituents of the feed to form lower boiling constituents, e.g., the conversion of n-heptane to propane and butane; and (4) dehydrocyclization of $C_6$ to $C_{12}$ paraffins to form aromatics, e.g., the conversion of n-heptane to form toluene or n-hexane to form benzene. This fourth reaction is especially critical for obtaining high octane motor fuels. Hydrogenolysis of any of the hydrocarbon components of the feed can occur on the metallic component of the catalyst, thus limiting the selectivity of conversion to more valuable products. In particular, the selectivity of paraffin aromatization is severely limited by hydrogenolysis. In addition to inhibition of hydrogenolysis, particular reactions may actually be enhanced such as the dehydrogenation of cyclohexane to benzene.

A typical feed stream would be a naphtha cut, either virgin or cracked. This is a petroleum fraction boiling generally between 80° and 450° F., preferably 125° to 375° F. Such a fraction usually contains about 20 to 80 vol. percent of paraffins both normal and branched, which fall in the range of $C_5$ to $C_{12}$, about 20 to 80 vol. percent of naphthenes falling in the range of $C_6$ to $C_{12}$ and about 5 through 20 vol. percent of the desirable aromatics falling in the range of $C_6$ to $C_{12}$.

It should be emphasized that although it is most desirable to treat a petroleum fraction, such as those described above, any hydrocarbon fraction containing paraffins, naphthenes, etc. may be converted by means of the catalyst of the instant invention.

The contacting between the feed stream and the catalyst may take place at a temperature of 600° to 1,000° F. preferably 750° to 1,000° F.

The various reactions outlined above are preferably run in the presence of hydrogen to suppress side reactions leading to the formation of unsaturated carbonaceous residues on the surface. Such residues lead to excessive deactivation of the catalyst. The hydrogen rate, once-through or recycle, in generally between 1,000 and 12,000 s.c.f./bbl., preferably 2,000 to 10,000 s.c.f./bbl. In addition to the reactions heretofore mentioned, the catalysts of this invention could be used for hydrogenation reactions of olefins, diolefins, acetylenes, aromatics, and various oxygenated hydrocarbons. They could also be used in hydrocarbon synthesis from CO and $H_2$.

The feed stream, in admixture with hydrogen, is passed over the catalyst at a space velocity of 0.1 to 25 W/W/hr., preferably 1.0 to 5.0 W/W/hr. A series of reactors may be operated adiabatically with reheating between the various elements in the series. Conventional reactors would be utilized and the preferred metal for fabrication of the reactor, which would contain the catalyst, is carbon steel.

SPECIFIC EMBODIMENTS

EXAMPLE 1

In this example a Group IB metal, copper, was alloyed with a Group VIII metal, nickel, to selectively inhibit undesirable hydrogenolysis reactions. The alloy was prepared as follows:

An aqueous solution of 76 grams of $Cu(NO_3)_2 \cdot 3H_2O$ and 99.1 grams of $Ni(NO_3)_2 \cdot 6H_2O$ in 1,026 ml. of solution was prepared, and to the solution was added 113.9 grams of ammonium bicarbonate. The precipitate formed was filtered from the solution and washed four times with a liter of hot water each time. The precipitate was then dried for 16 hours at 230° F. The dried material was then calcined for 2 hours in air at —b 750° F. The resulting mixed oxide was then reduced overnight in flowing hydrogen at 662° F. to form the copper-nickel alloy. Formation of an alloy was demonstrated by determination of the lattice constant by X-ray diffraction, which was 3.5669 A. This value is intermediate between the lattice constants for pure copper (3.6152 A.) and pure nickel (3.5237 A.), as would be expected for an alloy.

A series of copper-nickel alloys of varying compositions was prepared in this was by simply varying the amounts of reagents used. The catalysts were tested for the dehydrogenation of cyclohexane to benzene and for the hydrogenolysis of ethane to methane in a single fixed bed reactor. The cyclohexane dehydrogenation tests were conducted at 600° F., 1 atm. total pressure, and a $H_2$/Hydrocarbon mole of 5/1. The ethane hydrogenolysis tests were conducted at 600° F. and 1 atm. total pressure, using a reactant mixture with a composition (mole percent) of 3 percent ethane, 20 percent hydrogen, and 77 percent helium. Prior to the tests, the catalysts were rereduced in hydrogen for 2 hours at 850° F. in the reactor. The incorporation of copper with the nickel greatly decreased the hydrogenolysis activity; thus, the hydrogenolysis activities of alloys containing 5 to 70 atom percent copper were 1,000 to 100,000 times lower than that of pure nickel. On the other hand, the cyclohexane dehydrogenation activities were about three times higher than that of pure nickel and did not decrease significantly until the copper concentration was increased above about 90 atom percent. The data are summarized in table I.

TABLE I

Activities of Copper-Nickel Alloys

| Composition atom % Ni | Activity* Cyclohexane Dehydrogenation | Ethane Hydrogenolysis |
|---|---|---|
| 100 | 7.8 | 139.0 |
| 99.5 | 13.4 | 36.0 |
| 95 | 24.0 | 0.19 |
| 90 | — | 0.08 |
| 72 | 18.0 | 0.01 |
| 62 | 18.0 | 0.0036 |
| 52 | 30.0 | 0.0032 |
| 42 | 29.0 | 0.0017 |
| 32 | 35.0 | 0.0014 |
| 5 | 6.9 | — |
| 0.5 | 1.6 | — |
| 0 | 0.27 | — |

*Millimoles converted per hour per square meter of metal surface.

EXAMPLE 2

Ruthenium-copper and ruthenium-silver bimetallic catalysts supported on silica were prepared by an impregnation and their activities for the hydrogenolysis of ethane to methane were compared with those of the individual metals supported on silica. In all cases, silica with a surface area of about 300 m.$^2$/gm. was just wetted with an aqueous solution of a metal salt or salts. The impregnated silica was then dried at 230° F. and the resulting material reduced in flowing hydrogen at 850° F. for 2 hours in the reactor prior to catalytic rate measurements. The ruthenium-silica catalyst was prepared by impregnation of the silica with an aqueous solution of ruthenium trichloride, while the copper-silica and silver-silica catalysts were prepared using solutions of cupric nitrate and silver nitrate, respectively. The ruthenium-copper catalyst was prepared by impregnating the silica with an aqueous solution of ruthenium trichloride and cupric nitrate, while an aqueous solution of $RuNO(NO_3)_3$ and $AgNO_3$ was used in the preparation of the ruthenium-silver catalyst. About 0.2 to 5 grams of catalyst were utilized. It was found that copper or silver greatly decreased the hydrogenolysis activity of ruthenium. The hydrogenolysis runs were conducted at 572° F., 1 atm. total pressure, using a reactant mixture with a composition (mole percent) of 3 percent ethane, 20 percent hydrogen, and 77 percent helium. The data are summarized in table II.

TABLE II

Effect of Cu and Ag on the Hydrogenolysis Activity of Ru

Reaction: $C_2H_6 + H_2 \rightarrow 2CH_4$

| Catalyst* | Hydrogenolysis Activity 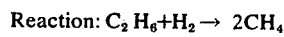 Moles ethane converted/hr./m.² metal |
|---|---|
| 5 % Ru | 0.70 |
| 5% Ru+5% Cu | 0.0003 |
| 5% Cu | <0.0003 |
| 5% Ru | 0.70 |
| 5% Ru+5% Ag | 0.0083 |
| 5% Ag | <<0.0083 |

*All catalysts supported on silica; compositions are wt. %.

EXAMPLE 3

The effect of copper and silver on the selectivity of ruthenium for conversion of cyclohexane to benzene was determined at 650° F., 1 atm. total pressure, $H_2$/hydrocarbon mole ratio=5/1, and a space velocity of 25 W/hr./W. The incorporation of copper or silver with ruthenium improves the selectivity of conversion to benzene, as shown in table III.

TABLE III

Effect of Cu or Ag on the Selectivity of Ru for Conversion of Cyclohexane to benzene

| Catalyst* | % Conversion | % Selectivity to Benzene |
|---|---|---|
| 1% Ru | 15.1 | 76.0 |
| 1% Ru+0.1% Cu | 9.7 | 83.5 |
| 1% Ru+1% Cu | 10.4 | 94.0 |
| 5% Cu | <0.5 | — |
| 1% Ru+1% Ag | 10.7 | 87.9 |
| 1% Ag | <0.1 | — |

*All catalysts supported on Davison 922 silica; composition are wt. %.

The catalysts were prepared by impregnation of silica with aqueous solutions of the metal salts ($RuCl_3$ or $RuNo(NO_3)_3$, $Cu(NO_3)_2 \cdot 6 H_2 O$, $AgNO_3$), followed by drying at 230° F. and subsequent reduction in flowing hydrogen at 850° F. for 1 hour. The Ru-Cu catalysts were prepared using $RuCl_3$, while the Ru-Ag catalyst was prepared using $RuNO(NO_3)_3$. Between 0.2 and 5 grams of catalysts were utilized.

EXAMPLE 4

A mixture of 54 percent cyclohexane and 46 percent n-heptane was reformed over nickel and copper-nickel catalysts supported on silica at 650° F., 1 atm. total pressure, $H_2$/Hydrocarbon mole ratio =5/1, and a space velocity of 25 W/hr./W. The incorporation of the copper greatly improved the yield of benzene, and correspondingly decreased the conversion to methane, as shown in table IV. Again about 0.2 to 5 grams of catalysts were utilized.

TABLE IV
[Effect of Cu on reforming selectivity of Ni-SiO₂ catalyst]

| Catalyst [1] | Total feed conversion, percent | Yield of benzene weight percent on feed | Yield of methane weight percent on feed |
|---|---|---|---|
| 5% Ni | 99.5 | 26 | 73.5 |
| 5% Ni plus Cu | 80.0 | 42 | 17.6 |

[1] Catalysts supported on Davison 922 silica.

The catalysts were prepared by impregnation of silica with aqueous solutions of the nitrate salts of the metals, followed by drying at 230° F. and subsequent reduction in flowing hydrogen at 850° F. for 1 hour in place in the reactor.

EXAMPLE 5

A mixture of 53 percent cyclohexane and 47 percent n-heptane was reformed over cobalt and cobalt-copper catalysts supported on silica at 650° F., 1 atm. total pressure, $H_2$/Hydrocarbon mole ratio =5/1, and a space velocity of 25 W/hr./W. The inclusion of the copper significantly improved the yield of benzene, and correspondingly decreased the conversion to methane, as shown in table V.

TABLE V
[Effect of Cu on reforming selectivity of Co-SiO₂ catalyst]

| Catalyst [1] | Total feed conversion, percent | Yield of benzene weight percent on feed | Yield of methane weight percent on feed |
|---|---|---|---|
| 5% Co | 11.6 | 3.2 | 5.0 |
| 5% Co plus 5% Cu | 13.8 | 9.2 | 0.9 |

[1] Catalysts supported on Davison 922 silica.

The catalysts were prepared by impregnation of silica with aqueous solutions of the nitrate salts of the metals, followed by drying at 230° F. and subsequent reduction in flowing hydrogen at 230° F. for 1 hour in the reactor. 850° for 1 hour in the reactor.

What is claimed is:

1. A process for catalytically reforming a naphtha feed stream in the presence of hydrogen, which comprises contacting said naphtha under reforming conditions and at a temperature of about 600° to 1,000° F. with a catalyst, said catalyst consisting essentially of a metal selected from the group consisting of Group VIII nonnoble metals and Group VIII₁ noble metals and a second metal selected from the group consisting of Group IB metals, on a high surface area support and recovering a reformed naphtha.

2. The process of claim 1 wherein said high surface area support has an area of at least 30 m.²/gram.

3. The process of claim 1 wherein the naphtha has a boiling range of 80° to 450° F.

4. The process of claim 1 wherein said high surface area support is an aluminosilicate, selected from the group consisting of amorphous or crystalline aluminosilicates.

5. The process of claim 1 wherein said support is silica.

6. The process of claim 1 wherein said feed stream is passed over the catalyst at a space velocity of 0.1 to 25 W/W/hr.

7. The process of claim 1 wherein said catalyst comprises nickel and copper.

8. The process of claim 1 wherein said catalyst comprises ruthenium and copper.

9. The process of claim 1 wherein said support is alumina.

10. The process of claim 9 wherein said support is a halogen-containing alumina.